US012567967B2

(12) United States Patent
Garrepalli et al.

(10) Patent No.: US 12,567,967 B2
(45) Date of Patent: Mar. 3, 2026

(54) SYSTEMS AND METHODS FOR SCHEDULING ACTIONS IN REMOTE NETWORKING ENVIRONMENTS WHILE MINIMIZING EXPOSURE OF SECURED ACCESS CREDENTIALS

(71) Applicant: Capital One Services, LLC, McLean, VA (US)

(72) Inventors: Suman Garrepalli, McLean, VA (US); Neeraj Muppidi, McLean, VA (US); Kristian Langholm, McLean, VA (US); Brian Newman, McLean, VA (US); David Harrington, Gibsonia, PA (US); Bruno Carneiro Ferreira, McLean, VA (US); Trever Hallock, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 222 days.

(21) Appl. No.: 18/424,975

(22) Filed: Jan. 29, 2024

(65) Prior Publication Data

US 2025/0247234 A1 Jul. 31, 2025

(51) Int. Cl.
*H04L 9/32* (2006.01)
(52) U.S. Cl.
CPC ................................. *H04L 9/3213* (2013.01)

(58) Field of Classification Search
CPC ... H04L 9/3213; H04L 9/3247; H04L 9/3234; H04L 63/0807; H04L 63/08
See application file for complete search history.

(56) References Cited

U.S. PATENT DOCUMENTS

| | | | | |
|---|---|---|---|---|
| 10,567,381 | B1 * | 2/2020 | Baer | H04L 63/068 |
| 10,602,094 | B1 * | 3/2020 | Longo | G06F 21/10 |
| 10,666,657 | B1 * | 5/2020 | Threlkeld | H04L 9/0643 |
| 2013/0086658 | A1 * | 4/2013 | Kottahachchi | H04L 63/10 726/6 |
| 2018/0183775 | A1 * | 6/2018 | Malkapuram | G06F 11/302 |
| 2021/0176236 | A1 * | 6/2021 | Dimitrov | G06F 21/33 |

* cited by examiner

*Primary Examiner* — Mohammad A Siddiqi
(74) *Attorney, Agent, or Firm* — Foley & Lardner LLP

(57) ABSTRACT

Systems and methods for scheduling actions in remote networking environments while minimizing exposure of secured access credentials using a bifurcated security approach. The system may receive confirmation of a first verification that the first user is authorized to access the remote server. The system may, after providing access to the remote server, receive and schedule a first action. The system may generate a first access token for the remote server, wherein the first access token is specific to the first user. The system may authorize, via a second verification, the first action based on determining that the first access token is currently valid.

20 Claims, 4 Drawing Sheets

<u>400</u>

```
┌─────────────────────────────────────────────────────┐
│   Receive a first user request to access a cloud resource   │
└─────────────────────────────────────────────────────┘  402
                          │
                          ▼
┌─────────────────────────────────────────────────────┐
│        Receive a confirmation of a first verification        │
└─────────────────────────────────────────────────────┘  404
                          │
                          ▼
┌─────────────────────────────────────────────────────┐
│      Receive a second user request to schedule an action      │
└─────────────────────────────────────────────────────┘  406
                          │
                          ▼
┌─────────────────────────────────────────────────────┐
│                 Generate an access token                 │
└─────────────────────────────────────────────────────┘  408
                          │
                          ▼
┌─────────────────────────────────────────────────────┐
│    Perform a second verification based on the access token    │
└─────────────────────────────────────────────────────┘  410
                          │
                          ▼
┌─────────────────────────────────────────────────────┐
│    Authorize the action based on the second verification    │
└─────────────────────────────────────────────────────┘  412
```

FIG. 4

SYSTEMS AND METHODS FOR SCHEDULING ACTIONS IN REMOTE NETWORKING ENVIRONMENTS WHILE MINIMIZING EXPOSURE OF SECURED ACCESS CREDENTIALS

BACKGROUND

Access credentials are a type of security credential used in authentication and authorization processes, especially in the context of computer systems and web services. They are typically used to prove the identity of a user or system and provide permission to access specific resources or perform certain actions. Access credentials play a crucial role in maintaining the security and privacy of data and services, particularly in the realm of web applications and cloud-based resources. In many cases, access credentials may comprise, and/or be based on, user data. User data may refer to any data or information that is generated, collected, and/or provided by individuals using software, websites, applications, or other online platforms. User data may comprise personal data (e.g., details such as a user's name, email address, phone number, password, and/or other identifying information), device information (e.g., information about the user's device, including the operating system, browser, and device type), and/or other behavioral data (e.g., information about the user's device, including the operating system, browser, and device type).

Cloud resources, also known as cloud computing resources or cloud services, refer to the various components and capabilities offered by cloud service providers within a cloud computing environment. Cloud resources are hosted and delivered over the internet, and they enable organizations and individuals to access and utilize a wide range of computing, storage, networking, and software services without the need to own or manage physical infrastructure. In many cases, cloud resources require access credentials to use.

However, cloud resources requiring access credentials to use may create security and/or privacy concerns as the access credentials and/or other user data may be stored by the cloud resources and are thus vulnerable to cyber attacks on the cloud resources.

SUMMARY

Systems and methods are described herein for novel uses and/or improvements to security protocols for cloud-based resources. As one example, systems and methods are described herein for mitigating security and/or privacy concerns when access credentials and/or other user data is required by a cloud resource to access the services of the cloud resource. Moreover, the systems and methods overcome the technical drawbacks of conventional methods for mitigating security and/or privacy concerns, in particular, when scheduling actions.

For example, in order to mitigate security and/or privacy concerns in general, existing systems may require unique access credentials to access a cloud resource. However, as the number of unique access credentials grows, managing them becomes infeasible. Accordingly, existing systems may use a secrets manager. A secrets manager is a specialized tool or service (typically a cloud service) that is used to securely store, manage, and control access to sensitive information, such as passwords, API keys, encryption keys, and other credentials or secrets used in software applications and systems. Thus, this proposed solution simply trades the potential security vulnerability of the cloud resource for the potential security vulnerability of another cloud resource (e.g., the secrets manager). Moreover, in instances involving scheduled actions, the existing systems must retrieve information from the secrets manager multiple times thus further exacerbating any risk.

In contrast, the systems and methods recite the use of a supplemental security application that allows for authenticating a user during a session with a cloud resource using a bifurcated validation approach based on public data. For example, the system creates an access token for the user during onboarding by validating that the user may access the cloud service (e.g., based on the user's employment status). Once the user has been authenticated, the user can schedule multiple jobs in the future. At the time of the multiple jobs, the previous authentication of the job is validated using that access token and public data (i.e., non-secured data). For example, the cloud resource may validate that the access token was generated during the onboarding of the user and confirm that the user may still run these jobs (e.g., the user is still employed) based on the public data (e.g., public employment status data).

In some aspects, systems and methods for scheduling actions in remote networking environments while minimizing exposure of secured access credentials using a bifurcated security approach are described. For example, the system may receive, from a first user at a first time point, a first user request to access at a remote server. The system may receive, from a supplemental security application, confirmation of a first verification that the first user is authorized to access the remote server, wherein the first verification is based on a first access credential issued by a first cybersecurity provider. The system may, after providing access to the remote server, receive, a second user request to schedule a first action at a second time point, wherein the second time point is after the first time point. The system may, in response to receiving the second user request, generate a first access token for the remote server, wherein the first access token is specific to the first user. The system may schedule, at the remote server, the first action to be performed at the second time point. The system may determine a current time point corresponds to the second time point. The system may, in response to determining that the current time point corresponds to the second time point, authorize the first action based on determining that the first access token is currently valid. The system may, in response to determining that the first access token is currently valid, perform the first action.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in scheduling actions in remote networking environments, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
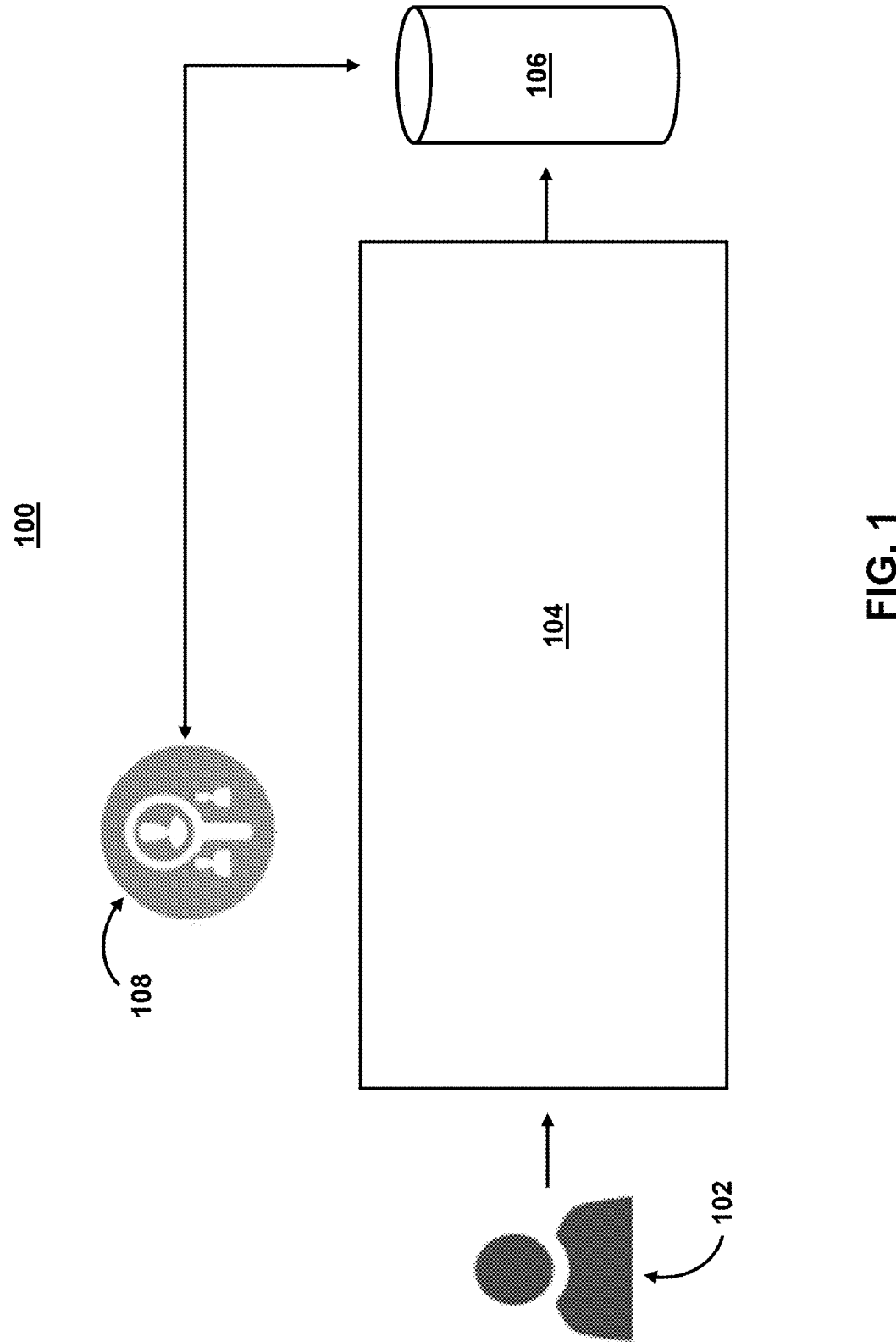
FIG. 1 shows an illustrative diagram for a system using a bifurcated security approach, in accordance with one or more embodiments.

FIG. 1 shows an illustrative diagram for a system using a bifurcated security approach, in accordance with one or more embodiments. For example, system 100 (e.g., as implemented on one or more system components described above) may be used to schedule actions in remote networking environments while minimizing exposure of secured access credentials by using a bifurcated security approach. For example, system 100 may represent a user request (e.g., via user interface 102) to access cloud resource 106 by way of supplemental security application 104. To authenticate the user while mitigating security and/or privacy concerns (e.g., exposure of access credentials to unauthorized parties), system 100 may use a bifurcated security approach. The bifurcated security approach may include a first validation upon the user initially attempting to access cloud resource 106 and a second validation at run time of a scheduled action. During the second validation, system 100 may use entitlements 108 to re-verify the user.

As described herein, "access credentials" may be a set of information used to authenticate and authorize an individual, system, and/or application to access a particular resource, system, or service. These credentials may be in the form of a username and a password, but they can also include other types of authentication factors, such as API keys, tokens, certificates, and/or biometric data. In some embodiments, access credentials are used to verify the identity (and/or authorizations) of an individual and/or requesting service. Examples of this verification may occur when a user is logging into user accounts for cloud resources, websites, email services, banking apps, etc. The credentials are typically a username (or email address) and a password. In some cases, multi-factor authentication (MFA) may be used, adding an extra layer of security by requiring additional verification factors, such as a one-time code sent to a mobile device.

In some embodiments, access credentials are used to enable API access. These credentials allow the application to prove its identity and gain authorized access to specific APIs or services. In some embodiments, access credentials are used for system administrators and IT professionals to log in and manage servers and systems. This may involve a username and password, SSH keys, or other authentication methods. In some embodiments, access credentials are used to control access to devices and network resources. This includes routers, switches, firewalls, and other network infrastructure components. Users may need to enter credentials to gain access to a secure Wi-Fi network, for example. In some embodiments, access credentials are used to access and manage cloud services such as virtual machines, databases, storage, and more. Cloud providers often use a combination of usernames, passwords, API keys, and role-based access control to manage access.

In some embodiments, system 100 may comprise and/or have access to databases that store entitlements (e.g., entitlements 108) related to access credentials. As described herein, "entitlements" may refer to the permissions, rights, and/or privileges granted to a computer, user, system, and/or application to perform certain actions or access specific resources (e.g., cloud resource 106) within a computing environment (e.g., system 100). These entitlements are used to define and control what entities can do and access within a computer system or network. In some embodiments, entitlements may determine what users or systems are allowed to do within a computing environment. This includes actions like reading, writing, deleting, or executing files, accessing specific folders, and interacting with various resources. In some embodiments, entitlements may assign roles to users or entities, and each role has a predefined set of entitlements. In some cases, entitlements are granted for a specific duration, such as session-based access rights or temporary permissions for a particular task. For example, an entitlement may indicate that a given user is only entitled for a certain time period and/or may be changed upon a triggering event (e.g., a change in an employment status of a user, a change in a role of a user, etc.).

Entitlements may be closely related to authorization, as they specify who has the authority to perform certain actions. However, entitlements may be public data that is different from access credentials. Public computer data may refer to data that is openly accessible to the public or a wide audience. This data may not be restricted or protected by access controls, passwords, encryption, or other security measures. It is intended to be freely available for anyone to view, access, and use. The public data may comprise content on websites that are openly accessible to anyone with an internet connection, which is considered public computer data. This includes web pages, images, videos, and other digital assets. In some embodiments, public data may be provided by public application programming interfaces (APIs) that allow developers to access and use certain data or services. This data is often made available for building third-party applications or integrations. Documents or files shared on the internet through cloud storage services or document-sharing platforms without access restrictions may also be considered public data. This can include documents, spreadsheets, and presentations. Content posted on social media platforms, blogs, forums, and/or other online communities can be considered public data if the user's privacy settings allow for public viewing. In some embodiments, public data may comprise data from databases and data repositories that are open to the public, and users can query, retrieve, and analyze data without restrictions.

In contrast to public data, private data may comprise information that is confidential and intended to be kept secure and protected from unauthorized access or disclosure. Private data is typically characterized by its sensitive or personally identifiable nature, and it often includes information that, if exposed, could lead to privacy violations, identity theft, financial fraud, or other significant harm. Private data may include personal information such as full names, social security numbers, national identification numbers, passport numbers, and driver's license numbers. Biometric information, such as fingerprints, retinal scans, and facial recognition data, is private because it is unique to individuals and can be used for identity verification. Usernames, passwords, PINs, and security questions and answers are private, as they protect access to online accounts and systems.

As shown in FIG. 1, system 100 may receive, at a first time point on a first user interface of a supplemental security application, a first user request to access at a remote server (e.g., cloud resource 106). For example, system 100 may perform an onboarding and/or registration of a scheduled job. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring the user.

System 100 may receive, from supplemental security application 104, a first verification that a first user is authorized to access the remote server, wherein the first verification is based on a first access credential issued by a first cybersecurity provider. A cybersecurity provider may comprise an organization or business that provides, whether in general and/or in any specialization, a cybersecurity product, service, protocol, and/or solution designed to protect information technology systems, networks, and data from a variety of threats and vulnerabilities. For example, a first cybersecurity provider may comprise an entity that include security protocols that limit the storing of access credentials outside the entity. For example, system 100 may authenticate a user (e.g., based on access credentials) and generate an access token. System 100 may verify access credentials through a process known as authentication. To perform the authentication, system 100 may receive from a user, system, or application its access credentials. These credentials can include a combination of the following: sername or identifier, password, API key, security token, certificate, or biometric data (e.g., fingerprint, facial recognition).

System 100 may use one or more methods to verify the submitted credentials including password matching. For example, if a password is submitted, system 100 (e.g., via supplemental security application 104) may check whether the provided password matches the stored password associated with the provided username or identifier. If a token is used (e.g., an API key or security token), system 100 (e.g., via supplemental security application 104) validates the token against a trusted authority to confirm its authenticity. For certificates, system 100 (e.g., via supplemental security application 104) verifies the digital certificate's authenticity and checks if it is signed by a trusted certificate authority. In the case of biometric data, system 100 (e.g., via supplemental security application 104) processes the submitted biometric information and compares it to the enrolled biometric data on record.

After performing the initial verification, system 100 may generate an access token for the user. For example, access tokens may be created by supplemental security application 104 to allow a user, application, or system to access specific resources or perform certain actions. The process of creating an access token involves several steps, and it often follows the principles of authentication and authorization.

After providing access to the remote server, system 100 may receive a second user request to schedule a first action at a second time point, wherein the second time point is after the first time point. The action may comprise any computer action. A computer action may refer to any operation, task, and/or activity that a computer or computing system can perform. These actions encompass a wide range of activities that computers execute to process data, perform tasks, and interact with users or other devices.

In some embodiments, an action may comprise a time or temporal component. For example, each action may comprise a timestamp, which may be a sequence of characters or encoded information that indicates a specific point in time, typically including both a date and a time. Timestamps are used to record and represent the exact moment an event occurred or when data was created or modified. When scheduling the action, system 100 may require a user to "register" a scheduled job and include his or her user identity and access token (e.g., the access token created during onboarding).

Figure 2:
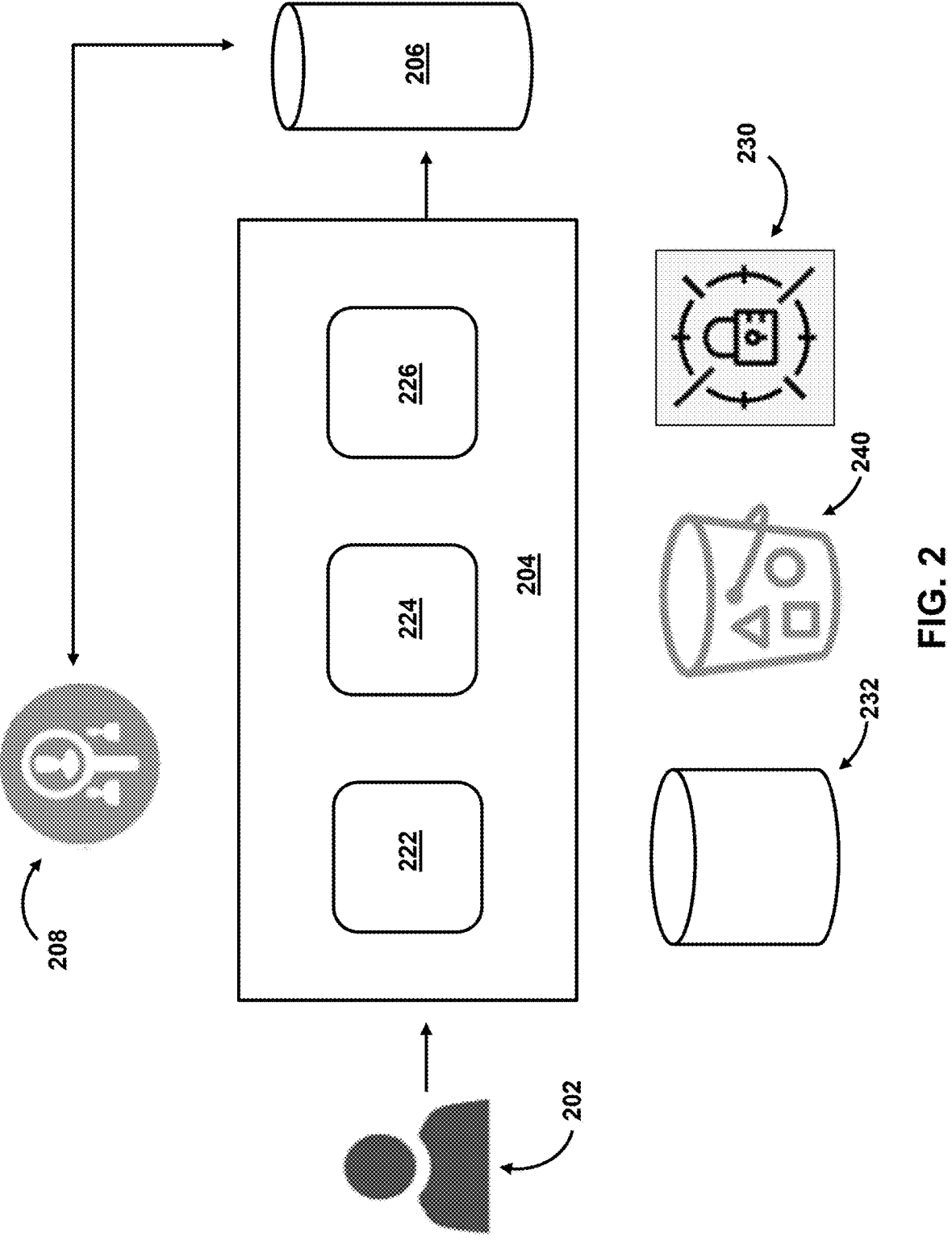
FIG. 2 shows an illustrative diagram for supplemental security application used in the bifurcated security approach, in accordance with one or more embodiments.

FIG. 2 shows an illustrative diagram for a supplemental security application used in the bifurcated security approach, in accordance with one or more embodiments. For example, system 200 (e.g., as implemented on one or more system components described above) may be used to schedule actions in remote networking environments while minimizing exposure of secured access credentials by using a bifurcated security approach. In some embodiments, system 200 may correspond to system 100. It should further be noted that one or more components of system 200 may perform one or more action attributed to system 200 (or otherwise described to be performed by system 200). For example, as shown in FIG. 2, system 200 includes supplemental security application 204. Supplemental security application 204 may include job manager 222, workflow 224, and resource connector 226.

For example, after providing access to a remote server (e.g., cloud resource 206), system 200 may receive a second user request (e.g., via user interface 202) to schedule a first action at a second time point, wherein the second time point is after the first time point. In response to receiving the second user request of the first user request, system 200 may generate a first access token for the remote server, wherein the first access token is specific to the first user, wherein the first access token is specific to the first action, and wherein the first access token is provided by the supplemental security application. The access token may allow the user to access specific resources (e.g., cloud resource 206) or perform certain actions without needing to provide the access credentials to the resource. For example, system 200 may generate an access token that is stored in repository 230.

To create the access token, the system may authenticate the access credentials. These credentials could include a username and password, an API key, a security token, or other forms of identification. System 200, which can be a web server, an identity provider, or a dedicated authentication service, verifies the submitted credentials to authenticate the user. Verification might involve checking the validity of the provided username and password, ensuring the API key is legitimate, or confirming the security token's authenticity. Once the user's identity is confirmed, system 200 associates the authenticated identity with the user, creating a context that will be used to generate the access token. Based on the user's authenticated identity, system 200 determines what resources or actions the user is allowed to access. This decision is often based on access control policies, roles, and permissions. If the user is authorized to access specific resources, system 200 generates an access token. The access token may be a cryptographic token that contains information about the user and the authorized actions or permissions. The access token may be encoded, typically as a JSON Web Token (JWT) or another format suitable for secure transmission and storage. The access token may contain information such as the user's identity, access permissions, a timestamp, and sometimes additional data. To enhance security, the access token may be signed or encrypted to prevent tampering or unauthorized modification. This ensures the token's integrity. The access token may be stored by the supplemental security application. The user (or supplemental security application) can then use the access token to gain access to specific resources (e.g., cloud resource 206) or services, presenting the token when making requests.

The resources may validate the token during each request to ensure that the user still has permission to access the requested resource (e.g., cloud resource 206) and/or when attempting to schedule an action. For example, system 200 may schedule the first action to be performed at the second time point. System 200 may then monitor a current time point corresponding to the second time point. The system may decode the access token to check if the identity included in generating the access token is the same identity in the decoded access token. System 200 may then authorize the registration based on a specific entitlement and store a "permission" object (e.g., in object store 240) in workflow 224.

System 200 may store metadata about the job (including user identity) in meta store 232. System 200 may also capture a timestamp of registration and set expiry of registration schedule (configurable in the codebase).

In some embodiments, system 200 may schedule actions or tasks through a process called task scheduling. Task scheduling is a fundamental capability of modern computer operating systems and software applications. To do so, system 200 may define a task or action that needs to be scheduled. This could be a program, script, job, or any other executable task. System 200 may rely on a scheduling mechanism, which can take various forms, to manage the scheduling of tasks. The scheduling mechanism may comprise a built-in task scheduler that can manage system tasks, application jobs, and services. It allows users to schedule tasks to run at specific times or under certain conditions. In UNIX and Linux systems, a cron daemon may enable users to schedule tasks through cron jobs. Users specify the schedule, and the cron daemon ensures that the tasks run at the designated times. Windows operating systems include the task scheduler tool, which allows users to create and manage scheduled tasks with specific triggers and actions.

Task schedulers use triggers to specify when a task should run. The triggers may include time-based triggers (e.g., tasks can be scheduled to run at specific times (e.g., 3:00 PM) or on a recurring basis (e.g., daily at 8:00 AM)), event-based triggers (e.g., tasks can be triggered by specific events, such as system startup, user login, or the completion of another task), resource-based triggers (e.g., tasks can be triggered based on resource availability, such as running a backup task when sufficient free storage space is available).

In response to determining that the current time point corresponds to the second time point, system 200 performs a second verification (e.g., based on a comparison against data at entitlements 208), wherein the second verification is based on the first access token, and wherein the second verification confirms that the first access token is currently valid by determining that the first user currently corresponds to the first cybersecurity provider. For example, access tokens often have a limited lifespan, and users must request a new token when the current one expires. Token renewal might involve re-authentication or other security measures to ensure the client's continued validity. In some embodiments, the lifespan of the access token may depend on whether an entitlement corresponding to the user (e.g., an employment status, role status, etc.), which may be publicly available, has changed.

System 200 may then authorize the first action (at the second time point) based on the second verification. For example, in response to determining that the first access token is currently valid, system 200 performs the first action. For example, job manager 222 may be triggered based on schedule. In response, supplemental security application 204 fetches metadata about the job (e.g., the first action). Supplemental security application 204 may inject a job token for a container to adhere to least privilege access. Supplemental security application 204 may fetch BatchID credentials to connect to cloud resource 206. Supplemental security application 204 may execute a stored procedure for user impersonation (e.g., impersonating the access credentials in order to execute the first action at cloud resource 206).

Figure 3:
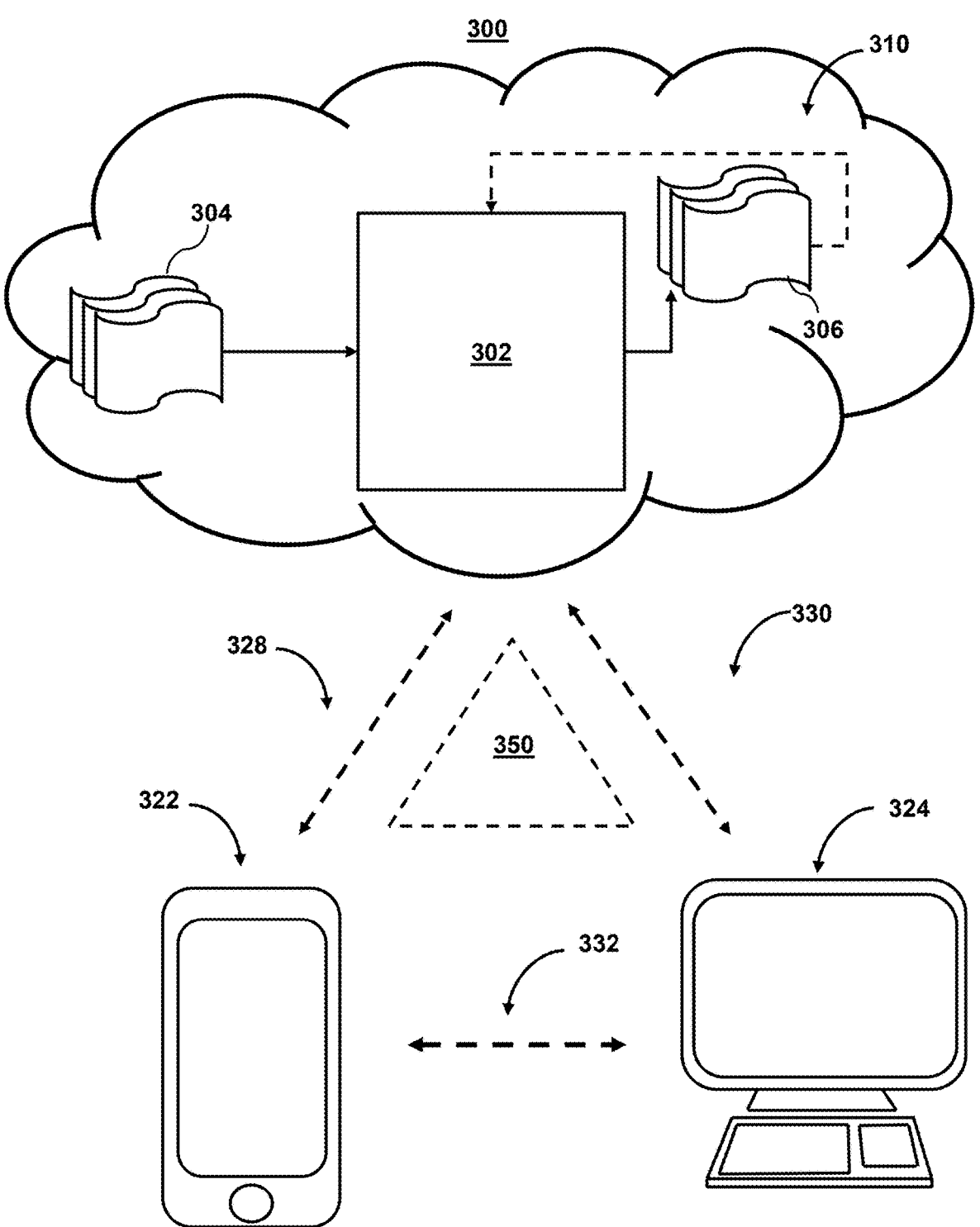
FIG. 3 shows illustrative components for a system used to provide the bifurcated security approach, in accordance with one or more embodiments.

FIG. 3 shows illustrative components for a system used to provide the bifurcated security approach, in accordance with one or more embodiments. For example, system 300 (e.g., as implemented on one or more system components described above) may be used to schedule actions in remote networking environments while minimizing exposure of secured access credentials by using a bifurcated security approach. For example, the actions may comprise the use of cloud resources and/or artificial intelligence models on the cloud resource. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., result of an action).

In some embodiments, the system may train a model (e.g., based on historic access token data) to determine a confidence level that the first action and the first access token correspond to the first user. The system may then compare the confidence level to a threshold confidence level. Determining the confidence level that an action and an access token correspond to a user may involve the model assessing the validity and security of the access token, and it may vary depending on the authentication and authorization mechanisms in place. For example, the model may receive inputs that may be used to generate a feature input for the model. The inputs may include checking the access token's authenticity and ensuring it has not been tampered with (e.g., based on verifying digital signatures, checking token expiration, and confirming that the token was issued by a trusted authentication provider). In some embodiments, the confidence level may be higher when the access token has been issued as a result of strong user authentication. MFA) or strong authentication methods, such as hardware tokens or biometric verification, can increase confidence in the token's association with the user.

In some embodiments, the system may bind the access token to specific user identifiers, such as a user's unique ID, email address, or username. This binding ensures that the token corresponds to a specific user. Sessions may also be used to maintain a connection between the user's authenticated identity and the access token. The confidence level increases when the token is associated with an active and authenticated session. Tokens are typically linked to a user's session during login and expire when the session ends. The ability to revoke access tokens when a user logs out, changes their password, or when suspicious activity is detected enhances confidence in the token's correspondence to the user. Token revocation helps prevent token misuse.

In web applications, HTTP cookies that store tokens should be set with secure and HTTP-only flags, making them less susceptible to attacks and enhancing the confidence in the token's security. In some embodiments, the system may validate the user's device and IP address during the token's creation or when the token is used. If the token's usage is associated with the user's known devices and IP addresses, the confidence level is higher. In some embodiments, the access token often contains information about the user's authorization scope, indicating what actions or resources the user is allowed to access. Verifying that the requested action aligns with the token's scope increases confidence in the correspondence between the token and the user.

In some advanced security systems, machine learning and behavioral analysis are used to assess the likelihood that an action corresponds to a user based on past behavior and patterns. Deviations from the user's typical behavior may trigger additional verification steps. The system may apply risk-based authentication to assess the risk associated with a particular action. Higher-risk actions may trigger additional authentication checks, while lower-risk actions may proceed with standard token verification.

The confidence level in the correspondence between an action and an access token to a user is a critical consideration in access control and security. It is typically determined by a combination of factors that may include the strength of authentication, the security of the token, and the mechanisms in place to bind the token to the user's identity and session. By doing so, the system ensures that security measures are designed to increase this confidence level while minimizing the risk of unauthorized access.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302 (e.g., a result of an action). In some embodiments, the model (e.g., model 302) may automatically perform actions based on outputs 306. In some embodiments, the model (e.g., model 302) may not perform any actions. The output of the model (e.g., model 302) may be used to perform scheduled actions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

FIG. 4 shows a flowchart of the steps involved in scheduling actions in remote networking environments, in accordance with one or more embodiments. For example, the system may use process 400 (e.g., as implemented on one or more system components described above) in order to schedule actions in remote networking environments while minimizing exposure of secured access credentials by using a bifurcated security approach.

At step 402, process 400 (e.g., using one or more components described above) receives a first user request to access a cloud resource. For example, the system may receive, from a first user at a first time point, a first user request to access at a remote server.

At step 404, process 400 (e.g., using one or more components described above) receives a confirmation of a first verification. For example, the system may receive, from a supplemental security application, confirmation of a first verification that the first user is authorized to access the remote server, wherein the first verification is based on a first access credential issued by a first cybersecurity provider.

In some embodiments, the system may receive the first verification by requesting, by the supplemental security application, a first access credential from the first user to schedule the first action. The system may verify the first user based on the first access credential.

At step 406, process 400 (e.g., using one or more components described above) receives a second user request to schedule an action. For example, the system may, after providing access to the remote server, receive a second user request to schedule a first action, at a second time point, at the remote server, wherein the second time point is after the first time point.

In some embodiments, the system may use task scheduling to schedule the first action. For example, the system may schedule the first action to be performed at the second time point by generating a record, at the remote server, corresponding to the first action and populating the record with action characteristics for the first action, wherein the action characteristics comprise the first access token and a public identifier for the first user.

At step 408, process 400 (e.g., using one or more components described above) generates an access token. For example, the system may, in response to receiving the second user request, generate a first access token for the remote server, wherein the first access token is specific to the first user.

In some embodiments, the system may generate an access token that is specific to an action, user, and/or cybersecurity provider. For example, the system may generate, at the remote server, a plurality of unique identifiers corresponding to each action of a plurality of actions. The system may select a first unique identifier from the plurality of unique identifiers for linking to the first action. The system may link the first unique identifier to the first access token. In another example, the system may generate, at the remote server, a plurality of unique identifiers corresponding to each user of a plurality of users. The system may select a first unique identifier from the plurality of unique identifiers for linking to the first user. The system may link the first unique identifier to the first access token. In yet another example, the system may generate, at the remote server, a plurality of unique identifiers corresponding to each cybersecurity provider of a plurality of cybersecurity providers. The system may select a first unique identifier from the plurality of unique identifiers for linking to the first cybersecurity provider. The system may link the first unique identifier to the first access token.

At step 410, process 400 (e.g., using one or more components described above) performs a second verification based on the access token. For example, the system may, at the second time point, perform a second verification, wherein the second verification is based on the first access token, and wherein the second verification confirms that the first access token is currently valid by determining that the first user currently corresponds to the first cybersecurity provider (e.g., is currently employed by the cybersecurity provider). In another example, the system may schedule, at the remote server, the first action to be performed at the second time point. The system may then determine a current time point corresponds to the second time point.

In some embodiments, the system may determine whether the first access token is currently valid based on whether a user associated with the first access token is authorized to perform the action. For example, the system may determine that the first action corresponds to the first access token. The system may determine that the first access token corresponds to the first user. The system may determine that the first user is authorized, at the second time point, to access the remote server at the second time point. The system may determine whether a user corresponds to an access token by following a process of access control and authentication. Before an access token is issued or used, the user may authenticate his or her identity. This authentication process can involve various methods, such as providing a username and password, a biometric identifier (e.g., fingerprint or facial recognition), a one-time code from an MFA app, or other forms of identification. After successful authentication, the system issues an access token. This token serves as proof of the user's authenticated identity and includes information about the user's access permissions and the resource he or she is allowed to access. The system associates the access token with the authenticated user. The system may create a session that links the user's authenticated identity to the access token. The session typically has a unique identifier and may be stored server-side or client-side (e.g., in a browser cookie). Additionally or alternatively, the system may maintain a user database where the access token is linked to the user's account or profile. This allows the system to verify the token against the user's account when needed. Additionally or alternatively, when OAuth 2.0 is used for authentication and authorization, the system may rely on an identity provider (IdP) to authenticate the user and provide an identity token (ID token). The ID token is linked to the user's identity, and the access token is obtained based on the ID token. When the user attempts to access a resource, the user may include the access token in their request. The token may be sent in the HTTP headers, query parameters, or as a part of the request body, depending on the authentication and authorization mechanism used. The system receiving the request validates the access token to determine if it is still valid, has not expired, and is associated with the user's authenticated identity. The system then checks the access token to ensure that the user has the necessary permissions to access the requested resource. This is often based on access control policies and user roles. If the access token is valid and the user has the required permissions, the system grants access to the requested resource. If the token is invalid or the user lacks the necessary permissions, access is denied.

In some embodiments, determining that the first user is authorized, at the second time point, to access the remote server at the second time point, may comprise the system determining that the first cybersecurity provider is authorized to access the remote server. The system may then determine that the first user is authorized, by the first cybersecurity provider, to access the remote server. For example, the system may maintain a user database where the access token is linked to a user's account and/or a cybersecurity provider. This allows the system to verify the token against a status (e.g., employment status) of the user and/or a status (e.g., subscription status to the cloud resources) of the cybersecurity provider. Additionally or alternatively, the system may determine a plurality of users currently authorized by the first cybersecurity provider (e.g., current employees) and determine that the first user is among the plurality of users. The system may retrieve the status from an entitlements database (e.g., entitlements 208 (FIG. 2)).

In some embodiments, the second verification may comprise a run-time verification. For example, authorizing the first action based on determining that the first access token is currently valid may comprise retrieving a plurality of actions corresponding to the second time point. The system may determine that the first action is included in the plurality of actions. The system may determine a run-time operation requirement for the first action. The system may then determine that the run-time operation requirement requires verification of the first access token.

For example, a run-time verification may refer to the process of monitoring and checking the behavior of a computer program or system while it is executing (i.e., during run time, immediately preceding run time, and/or while it is running). By doing so, the system ensures that the program adheres to specified requirements, constraints, or safety properties as it runs. Run-time verification can help detect and address issues, bugs, or unexpected behavior in real time, making it a valuable tool for improving the reliability and security of software. In some embodiments, during the execution of a program or system, run-time verification tools continuously monitor its behavior. This monitoring can include observing the requests, inputs, outputs, states, and/or control flow. Additionally or alternatively, run-time verification may rely on predefined specifications or properties that the system is expected to satisfy. These specifications can describe safety properties (e.g., absence of certain errors), liveness properties (e.g., progress towards a goal), or any other behavior or condition that the program should exhibit.

In some embodiments, run-time verification can be triggered by specific events, conditions, or points in the program's execution. For example, it can be activated when a specific function is called, when an error condition is detected, or on a periodic basis. Unlike static analysis, which examines the source code without executing it, run-time verification is a dynamic analysis technique. It observes the program as it runs, making it well-suited for identifying issues that may only become apparent during execution. The system may detect various types of errors, including run time errors (e.g., null pointer dereferences, buffer overflows), violations of security policies, violations of specified program behavior, and deviations from expected patterns.

In some embodiments, run-time verification systems not only monitor but also enforce compliance with specifications (e.g., verify an access token). If a violation is detected, the system may take corrective actions, such as halting the program, logging an event, or applying recovery strategies.

At step 412, process 400 (e.g., using one or more components described above) authorizes the action based on the second verification. For example, the system may authorize the first action based on the second verification. The system may, in response to determining that the first access token is currently valid, perform the first action. In another example, the system may, in response to determining that the current time point corresponds to the second time point, authorize the first action based on determining that the first access token is currently valid. The system may, in response to determining that the first access token is currently valid, perform the first action.

In some embodiments, the system may schedule additional actions and/or generate additional access tokens. For example, after providing access to the remote server, the system may receive a third user request to schedule a second action, at a third time point, at the remote server. In response to receiving the third user request, the system may generate a second access token for the remote server, wherein the second access token is specific to the second action. The system may schedule, at the remote server, the second action to be performed at the third time point.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for scheduling actions in remote networking environments while minimizing exposure of secured access credentials by using a bifurcated security approach.

2. A method of the proceeding embodiment, the method comprising: receiving, from a first user at a first time point, a first user request to access at a remote server; receiving, from a supplemental security application, confirmation of a first verification that the first user is authorized to access the remote server, wherein the first verification is based on a first access credential issued by a first cybersecurity provider; after providing access to the remote server, receiving, a second user request to schedule a first action at a second time point, wherein the second time point is after the first time point; in response to receiving the second user request, generating a first access token for the remote server, wherein the first access token is specific to the first user; scheduling, at the remote server, the first action to be performed at the second time point; determining a current time point corresponds to the second time point; in response to determining that the current time point corresponds to the second time point, authorizing the first action based on determining that the first access token is currently valid; and in response to determining that the first access token is currently valid, performing the first action.

3. The method of any one of the proceeding embodiments, wherein determining that the first access token is currently valid further comprises: determining that the first action corresponds to the first access token; determining that the first access token corresponds to the first user; and determining that the first user is authorized, at the second time point, to access the remote server at the second time point.

4. The method of any one of the proceeding embodiments, wherein determining that the first user is authorized, at the second time point, to access the remote server at the second time point further comprises: determining that the first cybersecurity provider is authorized to access the remote server; and determining that the first user is authorized, by the first cybersecurity provider, to access the remote server.

5. The method of any one of the proceeding embodiments, wherein determining that the first user is authorized, by the first cybersecurity provider, to access the remote server further comprises: determining a plurality of users currently authorized by the first cybersecurity provider; and determining that the first user is among the plurality of users.

6. The method of any one of the proceeding embodiments, wherein scheduling the first action to be performed at the second time point further comprises: generating a record, at the remote server, corresponding to the first action; and populating the record with action characteristics for the first action, wherein the action characteristics comprise the first access token and a public identifier for the first user.

7. The method of any one of the proceeding embodiments, wherein generating the first access token for the remote server further comprises: generating, at the remote server, a plurality of unique identifiers corresponding to each action of a plurality of actions; selecting a first unique identifier from the plurality of unique identifiers for linking to the first action; and linking the first unique identifier to the first access token.

8. The method of any one of the proceeding embodiments, wherein generating the first access token for the remote server further comprises: generating, at the remote server, a plurality of unique identifiers corresponding to each user of a plurality of users; selecting a first unique identifier from the plurality of unique identifiers for linking to the first user; and linking the first unique identifier to the first access token.

9. The method of any one of the proceeding embodiments, wherein generating the first access token for the remote server further comprises: generating, at the remote server, a plurality of unique identifiers corresponding to each cybersecurity provider of a plurality of cybersecurity providers; selecting a first unique identifier from the plurality of unique identifiers for linking to the first cybersecurity provider; and linking the first unique identifier to the first access token.

10. The method of any one of the proceeding embodiments, wherein receiving the first verification further comprises: requesting, by the supplemental security application, a first access credential from the first user to schedule the first action; and verifying the first user based on the first access credential.

11. The method of any one of the proceeding embodiments, further comprising: after providing access to the remote server, receiving a third user request to schedule a second action, at a third time point, at the remote server; in response to receiving the third user request, generating a second access token for the remote server, wherein the second access token is specific to the second action; and scheduling, at the remote server, the second action to be performed at the third time point.

12. The method of any one of the proceeding embodiments, wherein authorizing the first action based on determining that the first access token is currently valid further comprises: retrieving a plurality of actions corresponding to the second time point; determining that the first action is included in the plurality of actions; determining a run-time operation requirement for the first action; and determining that the run-time operation requirement requires verification of the first access token.

13. The method of any one of the proceeding embodiments, wherein authorizing the first action based on determining that the first access token is currently valid further comprises: inputting the first action and the first access token into an artificial intelligence model trained to identify users based on historic actions and access tokens; receiving an output from the artificial intelligence model; and determining whether to authorize the first action based on the output.

14. The method of any one of the proceeding embodiments, wherein determining whether to authorize the first action based on the output further comprises: determining a confidence level that the first action and the first access token correspond to the first user; and comparing the confidence level to a threshold confidence level.

15. One or more non-transitory, computer-readable mediums storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for scheduling actions in remote networking environments while minimizing exposure of secured information by using a bifurcated validation approach, the system comprising:

one or more processors; and one or more non-transitory, computer-readable mediums comprising instructions recorded thereon that when executed by the one or more processors cause operations comprising:

receiving, at a first time point on a first user interface of a supplemental security application, a first user request to access at a remote server;

receiving, from the supplemental security application, a first verification that a first user is authorized to access the remote server, wherein the first verification is based on a first access credential issued by a first cybersecurity provider;

after providing access to the remote server, receiving a second user request to schedule a first action at a second time point, wherein the second time point is after the first time point;

in response to receiving the second user request, generating a first access token for the remote server, wherein the first access token is specific to the first user, wherein the first access token is specific to the first action, and wherein the first access token is provided by the supplemental security application;

in response to generating the first access token for the remote server, scheduling the first action to be performed at the second time point;

determining a current time point corresponds to the second time point;

in response to determining that the current time point corresponds to the second time point, performing a second verification, wherein the second verification is based on the first access token, and wherein the second verification confirms that the first access token is currently valid by determining that the first user currently corresponds to the first cybersecurity provider;

authorizing the first action based on the second verification; and in response to determining that the first access token is currently valid, performing the first action.

2. A method for scheduling actions in remote networking environments while minimizing exposure of secured access credentials by using a bifurcated security approach, the method comprising:

receiving, from a first user at a first time point, a first user request to access at a remote server;

receiving, from a supplemental security application, confirmation of a first verification that the first user is authorized to access the remote server, wherein the first verification is based on a first access credential issued by a first cybersecurity provider;

after providing access to the remote server, receiving a second user request to schedule a first action at a second time point, wherein the second time point is after the first time point;

generating a first access token for the remote server, wherein the first access token is specific to the first user;

scheduling, at the remote server, the first action to be performed at the second time point;

determining a current time point corresponds to the second time point;

in response to determining that the current time point corresponds to the second time point, authorizing the first action based on determining that the first access token is currently valid; and in response to determining that the first access token is currently valid, performing the first action.

3. The method of claim 2, wherein determining that the first access token is currently valid further comprises:

determining that the first action corresponds to the first access token;

determining that the first access token corresponds to the first user; and determining that the first user is authorized, at the second time point, to access the remote server at the second time point.

4. The method of claim 3, wherein determining that the first user is authorized, at the second time point, to access the remote server at the second time point further comprises:

determining that the first cybersecurity provider is authorized to access the remote server; and determining that the first user is authorized, by the first cybersecurity provider, to access the remote server.

5. The method of claim 4, wherein determining that the first user is authorized, by the first cybersecurity provider, to access the remote server further comprises:

determining a plurality of users currently authorized by the first cybersecurity provider; and determining that the first user is among the plurality of users.

6. The method of claim 3, wherein scheduling the first action to be performed at the second time point further comprises:

generating a record, at the remote server, corresponding to the first action; and populating the record with action characteristics for the first action, wherein the action characteristics comprise the first access token and a public identifier for the first user.

7. The method of claim 2, wherein generating the first access token for the remote server further comprises:

generating, at the remote server, a plurality of unique identifiers corresponding to each action of a plurality of actions;

selecting a first unique identifier from the plurality of unique identifiers for linking to the first action; and linking the first unique identifier to the first access token.

8. The method of claim 2, wherein generating the first access token for the remote server further comprises:

generating, at the remote server, a plurality of unique identifiers corresponding to each user of a plurality of users;

selecting a first unique identifier from the plurality of unique identifiers for linking to the first user; and linking the first unique identifier to the first access token.

9. The method of claim 2, wherein generating the first access token for the remote server further comprises:

generating, at the remote server, a plurality of unique identifiers corresponding to each cybersecurity provider of a plurality of cybersecurity providers;

selecting a first unique identifier from the plurality of unique identifiers for linking to the first cybersecurity provider; and linking the first unique identifier to the first access token.

10. The method of claim 2, wherein receiving the first verification further comprises:

requesting, by the supplemental security application, a first access credential from the first user to schedule the first action; and verifying the first user based on the first access credential.

11. The method of claim 2, further comprising:

after providing access to the remote server, receiving a third user request to schedule a second action, at a third time point, at the remote server;

in response to receiving the third user request, generating a second access token for the remote server, wherein the second access token is specific to the second action; and scheduling, at the remote server, the second action to be performed at the third time point.

12. The method of claim 2, wherein authorizing the first action based on determining that the first access token is currently valid further comprises:

retrieving a plurality of actions corresponding to the second time point;

determining that the first action is included in the plurality of actions;

determining a run-time operation requirement for the first action; and determining that the run-time operation requirement requires verification of the first access token.

13. The method of claim 2, wherein authorizing the first action based on determining that the first access token is currently valid further comprises:

inputting the first action and the first access token into an artificial intelligence model trained to identify users based on historic actions and access tokens;

receiving an output from the artificial intelligence model; and determining whether to authorize the first action based on the output.

14. The method of claim 13, wherein determining whether to authorize the first action based on the output further comprises:

determining a confidence level that the first action and the first access token correspond to the first user; and comparing the confidence level to a threshold confidence level.

15. One or more non-transitory, computer-readable mediums, comprising instructions that, when executed by one or more processors, cause operations comprising:

receiving, from a first user at a first time point, a first user request to access at a remote server;

receiving, from a supplemental security application, confirmation of a first verification that the first user is authorized to access the remote server, wherein the first verification is based on a first access credential issued by a first cybersecurity provider;

after providing access to the remote server, receiving a second user request to schedule a first action, at a second time point, at the remote server, wherein the second time point is after the first time point;

in response to receiving the second user request, generating a first access token for the remote server, wherein the first access token is specific to the first user;

at the second time point, performing a second verification, wherein the second verification is based on the first access token, and wherein the second verification confirms that the first access token is currently valid by determining that the first user currently corresponds to the first cybersecurity provider;

authorizing the first action based on the second verification; and in response to determining that the first access token is currently valid, performing the first action.

16. The one or more non-transitory, computer-readable mediums of claim 15, wherein determining that the first user currently corresponds to the first cybersecurity provider further comprises:

determining that the first action corresponds to the first access token;

determining that the first access token corresponds to the first user; and determining that the first user is authorized, at the second time point, to access the remote server at the second time point.

17. The one or more non-transitory, computer-readable mediums of claim 16, wherein determining that the first user is authorized, at the second time point, to access the remote server at the second time point further comprises:

determining that the first cybersecurity provider is authorized to access the remote server; and determining that the first user is authorized, by the first cybersecurity provider, to access the remote server.

18. The one or more non-transitory, computer-readable mediums of claim 17, wherein determining that the first user is authorized, by the first cybersecurity provider, to access the remote server further comprises:

determining a plurality of users currently authorized by the first cybersecurity provider; and determining that the first user is among the plurality of users.

19. The one or more non-transitory, computer-readable mediums of claim 15, wherein generating the first access token for the remote server further comprises:

generating, at the remote server, a plurality of unique identifiers corresponding to each action of a plurality of actions;

selecting a first unique identifier from the plurality of unique identifiers for linking to the first action; and linking the first unique identifier to the first access token.

20. The one or more non-transitory, computer-readable mediums of claim 15, wherein generating the first access token for the remote server further comprises:

generating, at the remote server, a plurality of unique identifiers corresponding to each user of a plurality of users;

selecting a first unique identifier from the plurality of unique identifiers for linking to the first user; and linking the first unique identifier to the first access token.

* * * * *